(12) United States Patent
Lin

(10) Patent No.: US 7,316,024 B2
(45) Date of Patent: Jan. 1, 2008

(54) CUSHION ASSEMBLY FOR ABSORBING VIBRATION OF A DISC DRIVE

(75) Inventor: Jui-Chiang Lin, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 484 days.

(21) Appl. No.: 10/941,886

(22) Filed: Sep. 16, 2004

(65) Prior Publication Data
US 2005/0066345 A1    Mar. 24, 2005

(30) Foreign Application Priority Data
Sep. 19, 2003    (TW)    ............................... 92126025 A

(51) Int. Cl.
*G11B 33/08*    (2006.01)
(52) U.S. Cl. ...................................... 720/651
(58) Field of Classification Search ................ 720/651, 720/693; 360/256.2; 267/34
See application file for complete search history.

(56) References Cited

U.S. PATENT DOCUMENTS 5,379,990 A * 1/1995 Ando et al. .................... 267/34
5,956,314 A * 9/1999 Ishimatsu et al. ........... 720/693
6,040,960 A * 3/2000 Lindrose et al. ......... 360/256.2

FOREIGN PATENT DOCUMENTS

| JP | 63072938 A | * | 4/1988 |
| JP | 63219933 A | * | 9/1988 |
| JP | 04039438 A | * | 2/1992 |
| JP | 05159552 A | * | 6/1993 |
| WO | WO9013895 | * | 11/1990 |

* cited by examiner

*Primary Examiner*—Tianjie Chen
(74) *Attorney, Agent, or Firm*—Ming Chow; Sinorica, LLC

(57) ABSTRACT

A cushion assembly includes a retarding member, a support member and an urging member. The retarding member has a base portion and an upper portion formed with an upper end face, and is formed with a guiding hole extending inwardly and axially from the upper end face. The support member includes a support disc disposed above the upper end face of the retarding member, and a guiding post extending from the support disc into the guiding hole in the retarding member 4. The urging member is sleeved around the retarding member for urging the support disc upwardly and axially away from the retarding member.

17 Claims, 9 Drawing Sheets

CUSHION ASSEMBLY FOR ABSORBING VIBRATION OF A DISC DRIVE

This Nonprovisional application claims priority under 35 U.S.C. 119(a) on patent application Ser. No(s). 92126025 filed in Taiwan, Republic of China on Sep. 19, 2003, the entire contents of which are hereby incorporated by reference.

FIELD OF THE INVENTION

The present invention generally relates to a cushion assembly, and more particularly to a cushion assembly for use in a disc drive so as to absorb the vibration while operating in an unsteady environment.

DESCRIPTION OF THE RELATED ART

As the developments of information technology and the widespread application of multimedia contents, the demanding on data storage solutions with high capacities and low costs raises day by day. Among all the data storage solutions, the optical discs are becoming more and more important for backing up data and exchanging information because the optical storage media have many advantages including a high storage capacity, easy to handle and carry, and a long preserving time for the stored data. Till now, the optical disc drives can be found all around such as in desktop computers, laptop computers, DVD players, and even some instruments or electronic products with built-in microprocessors.

However, when the aforesaid disc drive is operated in an unsteady environment such as being mounted in an automobile, the optical disc drive will suffer from severe vibration while the automobile is in motion. This vibration can affect the focusing and tracking of the pickup head and make the rotation of the disc inserted therein unstable. This could result in difficulty of reproducing the data from the optical disc and make undesired noise.

SUMMARY OF THE INVENTION

The object of the present invention is to provide a cushion assembly for use in a disc drive so as to absorb the vibration caused due to rotation of an optical disc therein or absorb the vibration of the disc drive while operating in an unsteady environment.

Accordingly, a cushion assembly of the present invention is used for absorbing vibration of a disc drive and includes: a retarding member having a base portion and an upper portion formed with an upper end face, and being formed with a guiding hole extending inwardly and axially from the upper end face; a support member including a support disc disposed above the upper end face of the retarding member, a guiding post extending co-axially and downwardly from a low side of the support disc into the guiding hole in the retarding member, and a connecting element disposed on an upper side of the support disc; and an urging member sleeved around the retarding member for urging the support disc upwardly and axially away from the retarding member.

In another aspect of the present invention, a disc drive is provided to include a pick-up head for reading and/or writing an optical disc. The disc drive further includes: a casing having a bottom wall formed with a plurality of connecting ports such as threaded holes or fasteners; and a plurality of cushion assemblies for absorbing vibration of the casing. Each of the cushion assemblies includes a connecting element fastened to a respective one of the threaded holes in the bottom wall of the casing. Each cushion assembly includes: a retarding member having a base portion and an upper portion formed with an upper end face, and being formed with a guiding hole extending inwardly and axially from the upper end face; a support member including a support disc disposed above the upper end face of the retarding member, a guiding post extending co-axially and downwardly from a low side of the support disc into the guiding hole in the retarding member, the connecting element disposed on an upper side of the support disc; and an urging member sleeved around the retarding member for urging the support disc upwardly and axially away from the retarding member.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
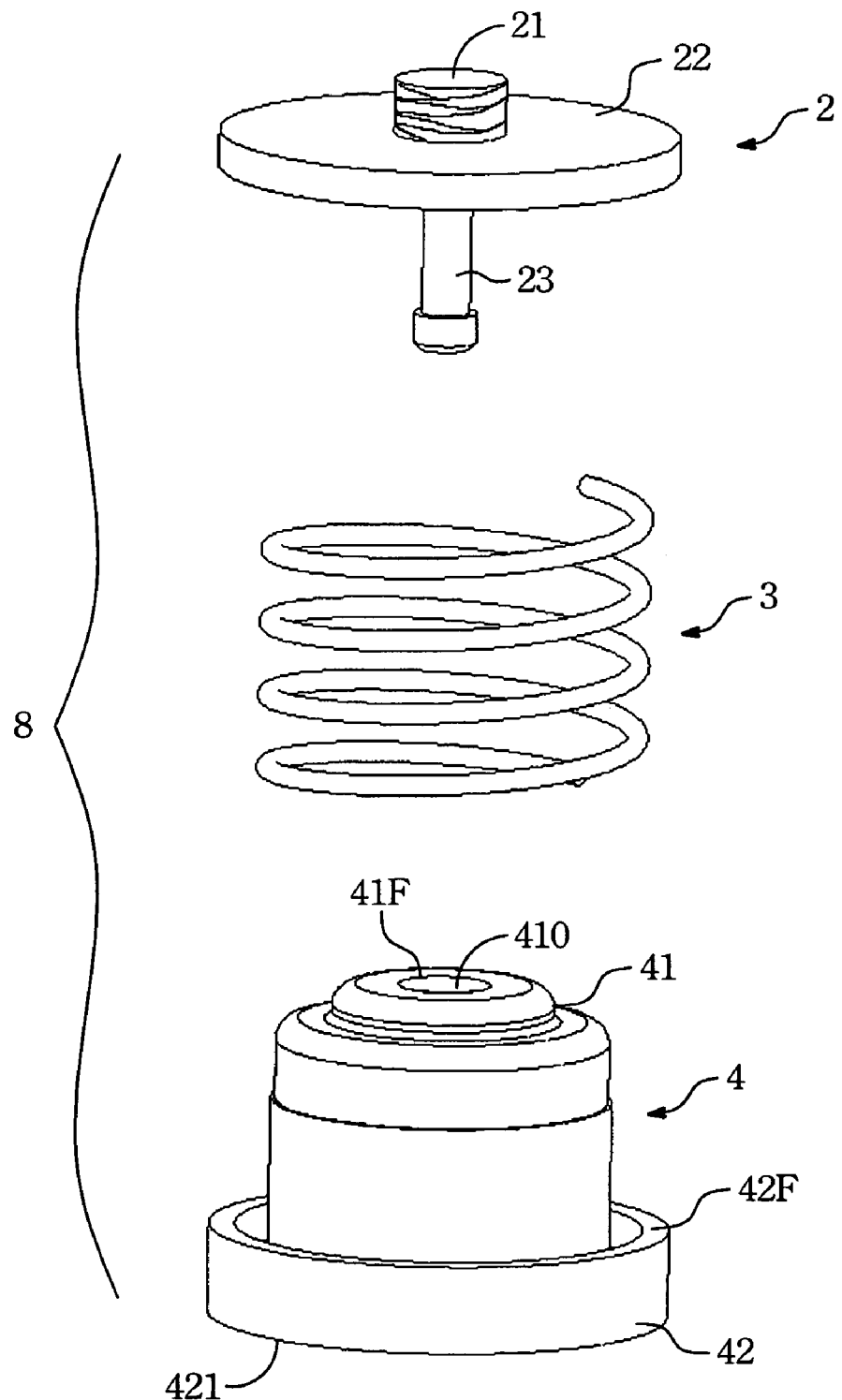
FIG. 1 shows an exploded view of the first preferred embodiment of a cushion assembly according to the present invention.

It should be noted that same reference numerals have been used to denote similar elements throughout the drawings and the specification.

Referring to FIG. 1, it shows an exploded view of the first preferred embodiment of a cushion assembly 8 according to the present invention. The first preferred embodiment of a cushion assembly 8 according to the present invention includes a retarding member 4, a support member 2, and an urging member 3. As illustrated in FIG. 1, the retarding member 4 has a base portion 42 and an upper portion 41 formed with an upper end face 41F. There is also a guiding hole 410 formed on the retarding member 4. The guiding hole 410 extends inwardly and axially from the upper end face 41F. The base portion 42 of the retarding member 4 has a lower end face 421 opposite to the upper end face 41F. The retarding member 4 further has a retention flange 42F extending upwardly from the lower end face 421 of the base portion 42. Preferably, the retarding member 4 is made from an elastomeric material, such as rubber.

The support member 2 is made from plastics, and includes a support disc 22 disposed above the upper end face 41F of the retarding member 4, a guiding post 23 extending co-axially and downwardly from a lower side of the support disc 22 and engaging slidably a surrounding wall defining the guiding hole 410 in the retarding member 4, and a connecting element 21 disposed on an upper side of the support disc 22. The guiding post 23 can slide within an operating range inside the guiding hole 410. Furthermore, the urging member 3, preferably a coil spring made from metal or an elastomeric material, is sleeved around the retarding member 4, and has upper and lower ends respectively biasing against the retention flange 42F and the support disc 22 of the support member 2, thereby urging the support disc 22 upwardly and axially away from the retarding member 4.

Figure 2:
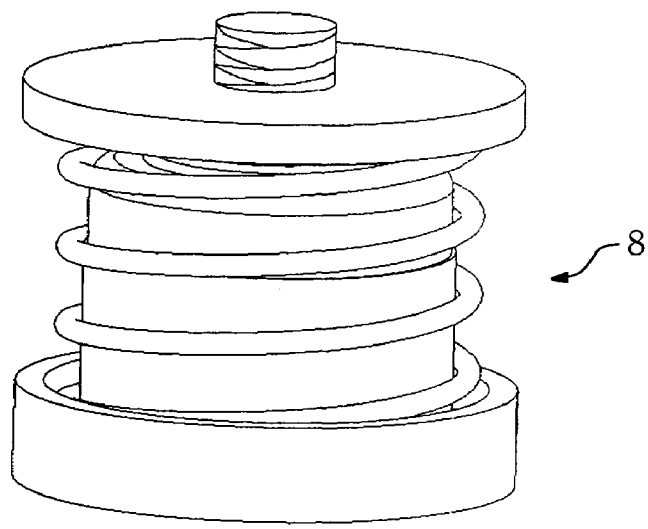
FIG. 2 shows a perspective view of the first preferred embodiment of the cushion assembly according to the present invention.

Please refer to FIG. 2. FIG. 2 shows a perspective view of the first preferred embodiment of the cushion assembly 8 according to the present invention. While a payload is installed with one or more of the cushion assemblies 8 is installed via each of the connecting element 21, the weight of the payload and the urging members 3 form equilibrium of static forces. If the payload connected with the cushion assembly 8 is suffering vibrations, the urging member 3 can offer a counter force against the displacement between support member 2 and the retarding member 4 thus to reduce the vibration. Besides, the retarding member 4 can further provides a damping force to ease the vibration according to higher order parameters such as the relative velocity between support member 2 and the retarding member 4.

Figure 3:
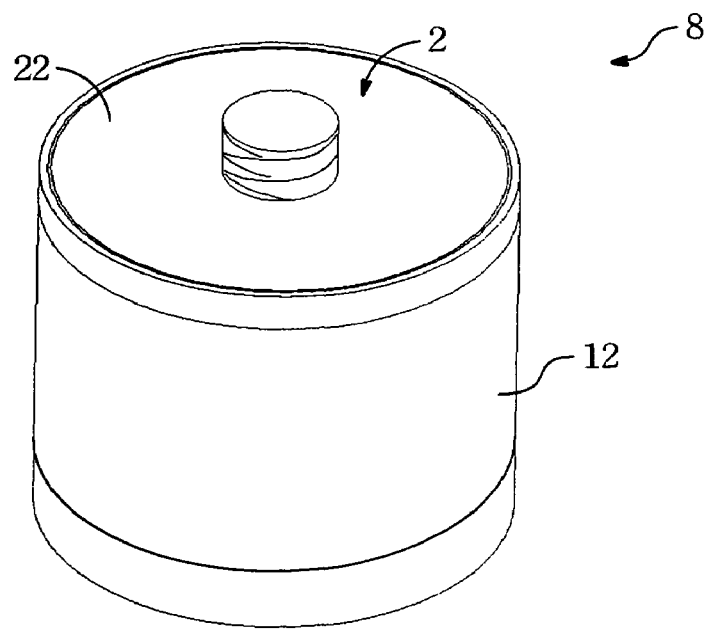
FIG. 3 shows a perspective view of the second preferred embodiment of a cushion assembly according to the present invention.

Referring to FIG. 3, it shows a perspective view of the second preferred embodiment of a cushion assembly 8 according to the present invention. Base on the elements and construction similar to the first preferred embodiment, the cushion assembly 8 according to the second preferred embodiment further has an outer flexible protective sleeve 12 disposed between the support disc 22 of the support member 2 and the retention flange 42F (see FIG. 1) to provide a protection of inner elements and an aesthetic decoration of the cushion assembly 8.

Figure 4:
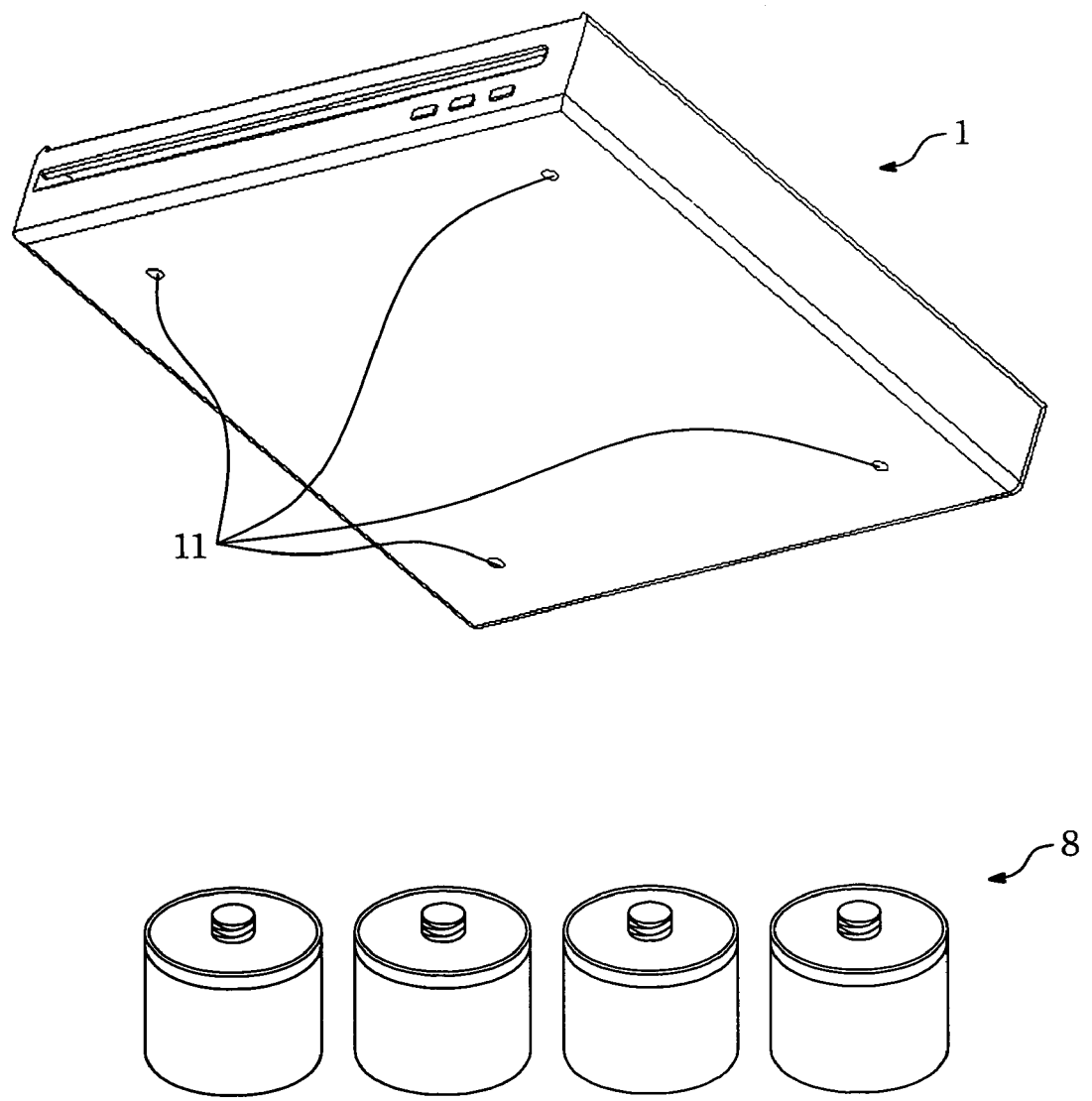
FIG. 4 illustrates how a plurality of the cushion assemblies according to the second preferred embodiment are used in a disc drive to absorb vibration.
Figure 5:
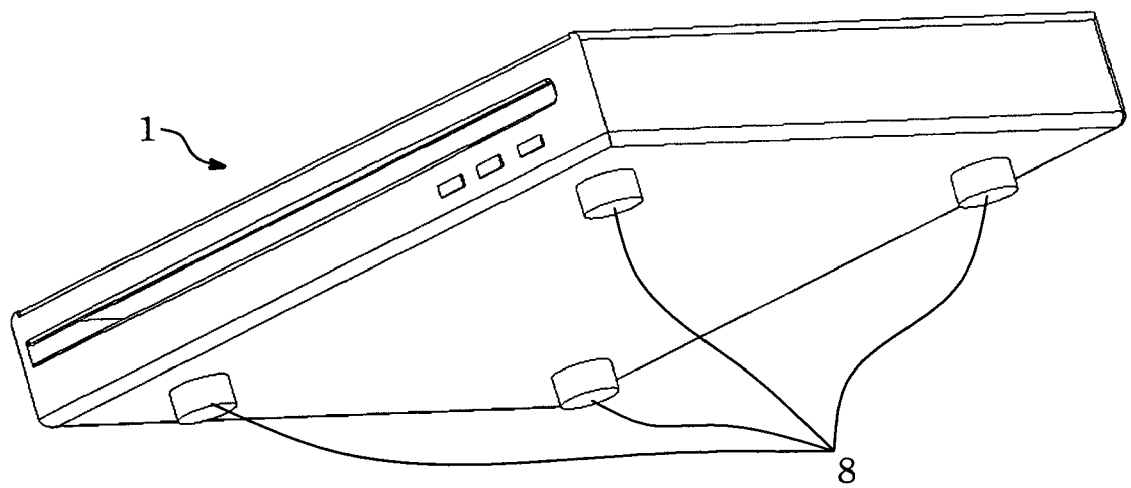
FIG. 5 is a perspective view of the disc drive provided with four pieces of the cushion assemblies according to the second preferred embodiment for absorbing vibration of the disc drive.

Referring to FIGS. 4 and 5, in order to absorb vibration of a disc drive 1, four pieces of the cushion assemblies 8 constructed according the second preferred embodiment are attached to four connecting ports such as threaded holes 11 in the bottom wall of a casing 1 of the disc drive, wherein the connecting element 21 of each of the cushion assembly 8 engages a peripheral wall defining a respective one the threaded holes 11 in the bottom wall of the casing 1 to prevent disengagement of the cushion assemblies 8 from the casing 1. Although FIG. 5 only illustrating the cushion assemblies 8 constructed according to the second preferred embodiment using on a disc drive, the cushion assemblies 8 according the first preferred embodiment using on a disc drive work in similar sense. The disc drive includes a pick-up head (not visible) disposed with the casing 1 for reading and/or writing an optical disc once inserted therein. Since the relevant feature of the present invention does not reside therein, a detailed description thereof is omitted herein for the sake of brevity.

Figure 6:
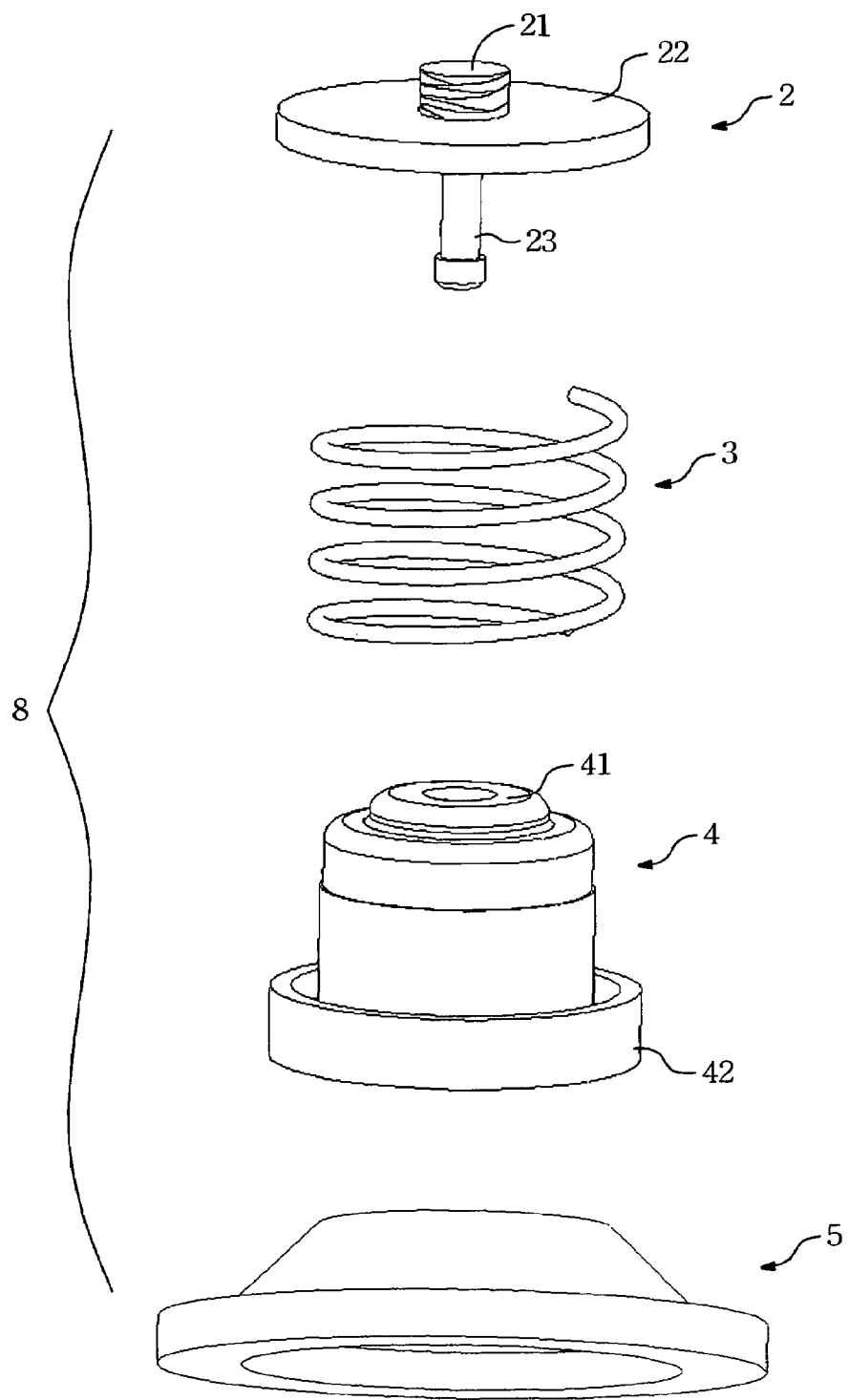
FIG. 6 is an exploded view of the third preferred embodiment of a cushion assembly according to the present invention.

Referring to FIG. 6, it is an exploded view of the third preferred embodiment of a cushion assembly 8 according to the present invention. Base on the elements and construction similar to the second preferred embodiment, each of the cushion assembly 8 according to the third preferred embodiment further has a suction cups 5. Each of the suction cups 5 is preferably made from an elastic material, and has an upper end face attached firmly to the lower end face 421 (see FIG. 1) of the retarding member 4 via adhesive materials. Thus, the suction cup 5 can be pressed against a mounting wall (not shown) so as to be fastened on thereon, thereby enhancing the absorbing ability of the payload connected to the cushion assembly 8 such as a disc drive.

Figure 7:
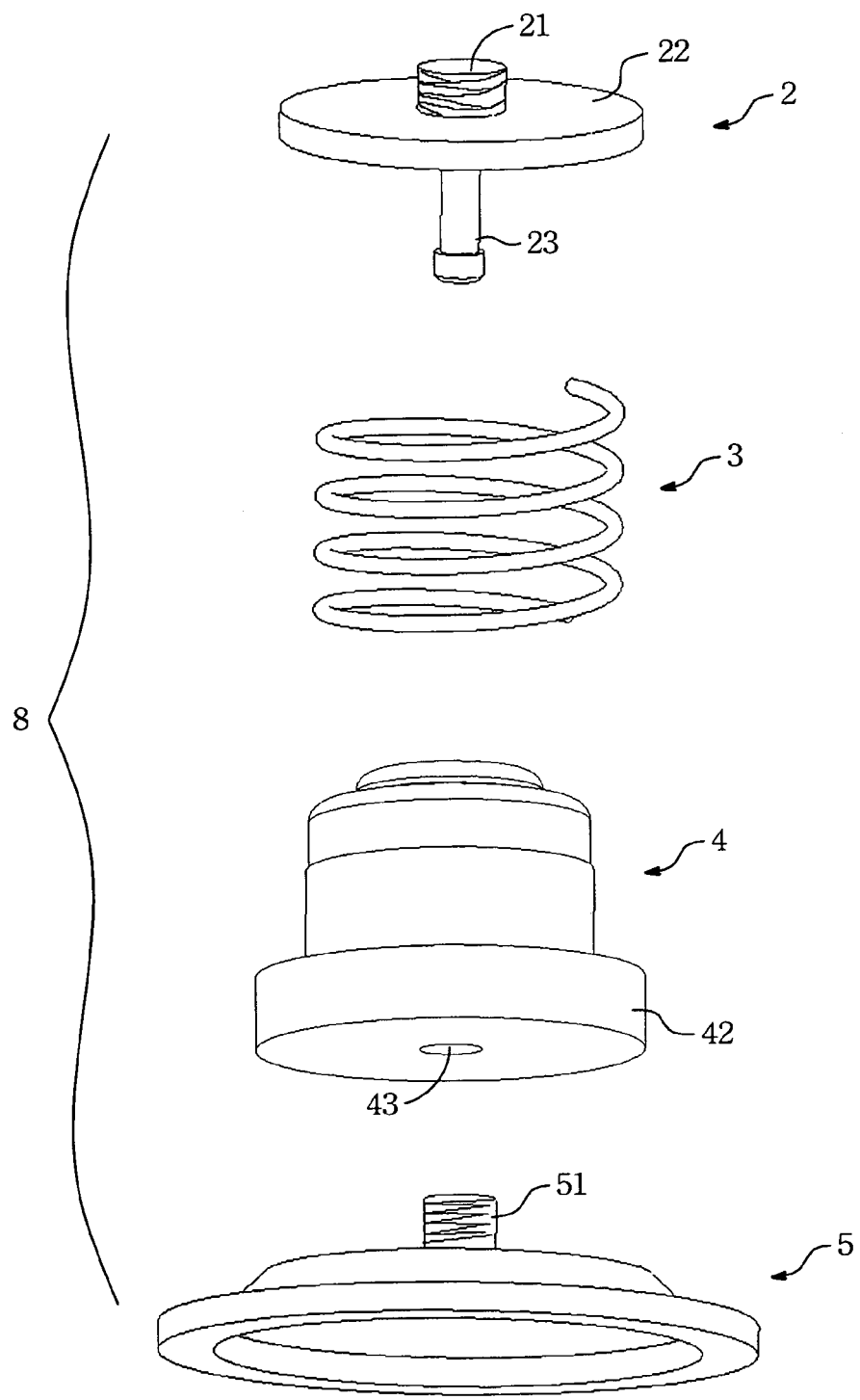
FIG. 7 is an exploded view of the fourth preferred embodiment of a cushion assembly according to the present invention.
Figure 8:
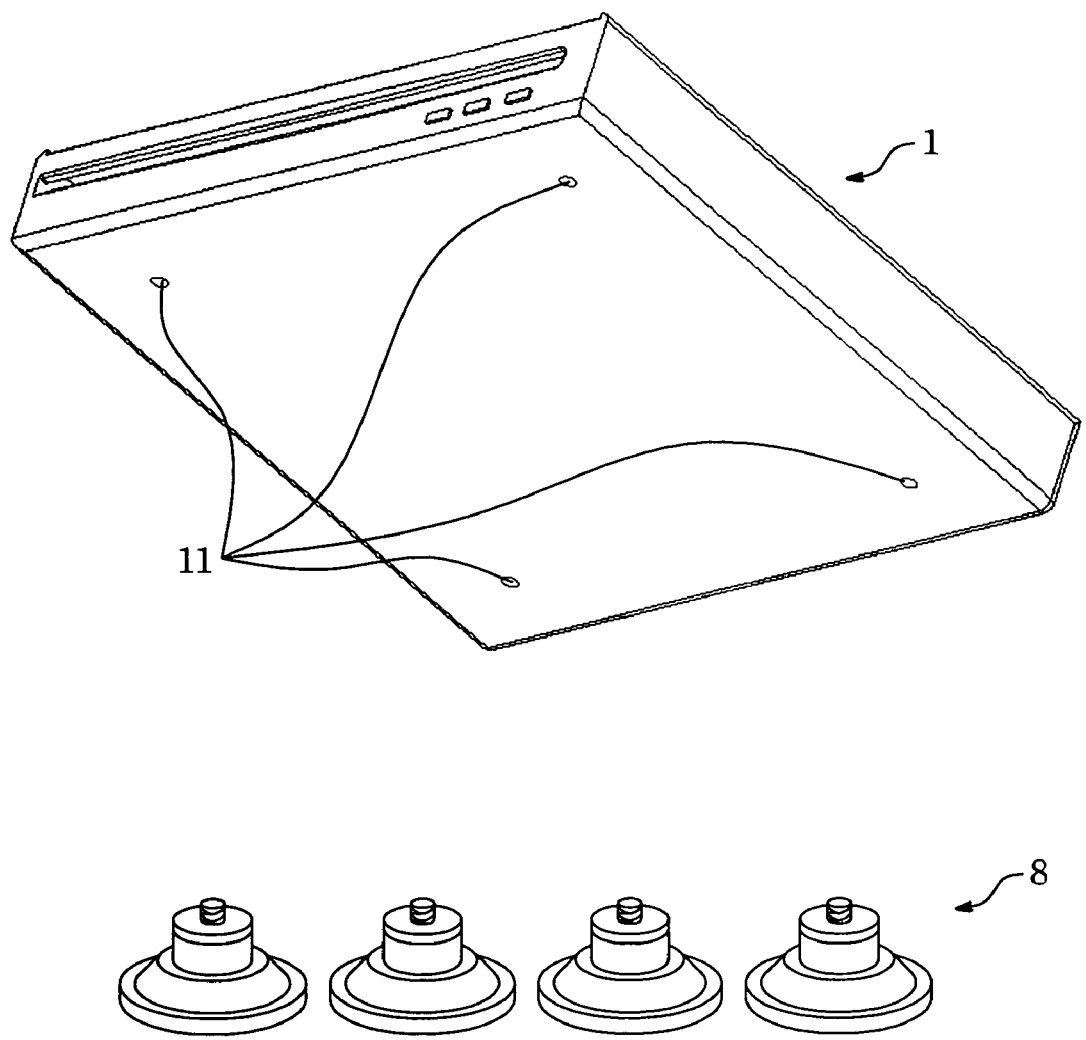
FIG. 8 illustrates how a plurality of the cushion assemblies according to the fourth preferred embodiment are used in a disc drive.
Figure 9:
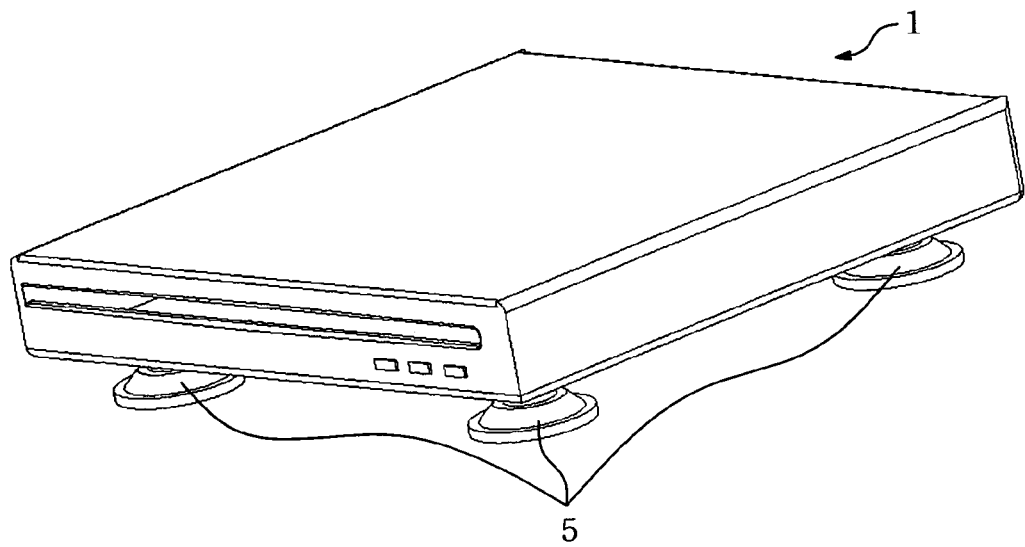
FIG. 9 shows a top view of the disc drive provided with four pieces of the cushion assemblies according to the fourth embodiments for absorbing vibration of the disc drive.
Figure 10:
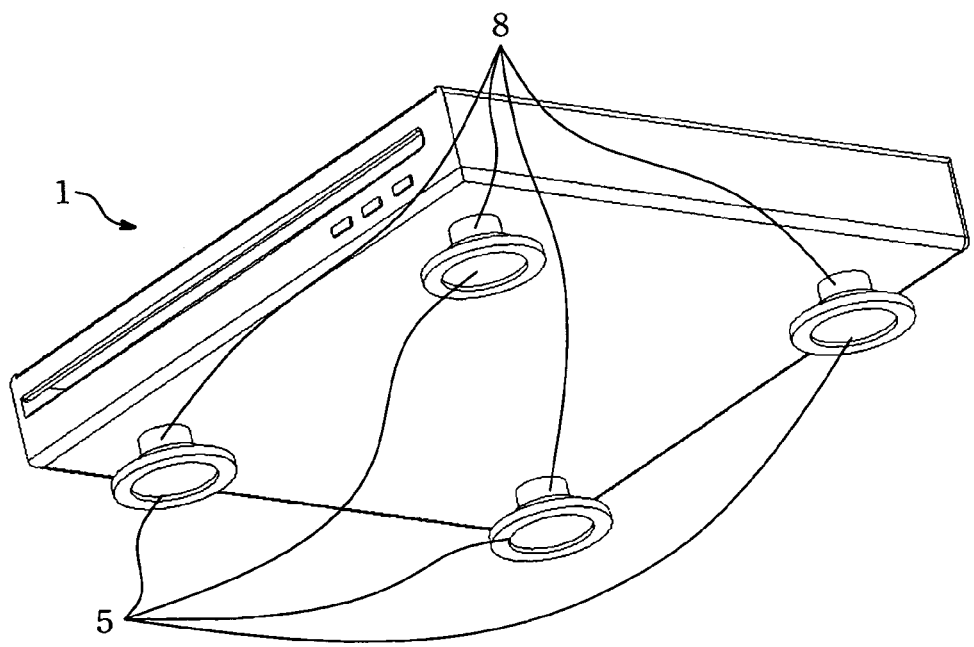
FIG. 10 shows a bottom view of a disc drive provided with four pieces of the cushion assemblies according to the fourth embodiment for absorbing vibration of the disc drive.
Figure 11:
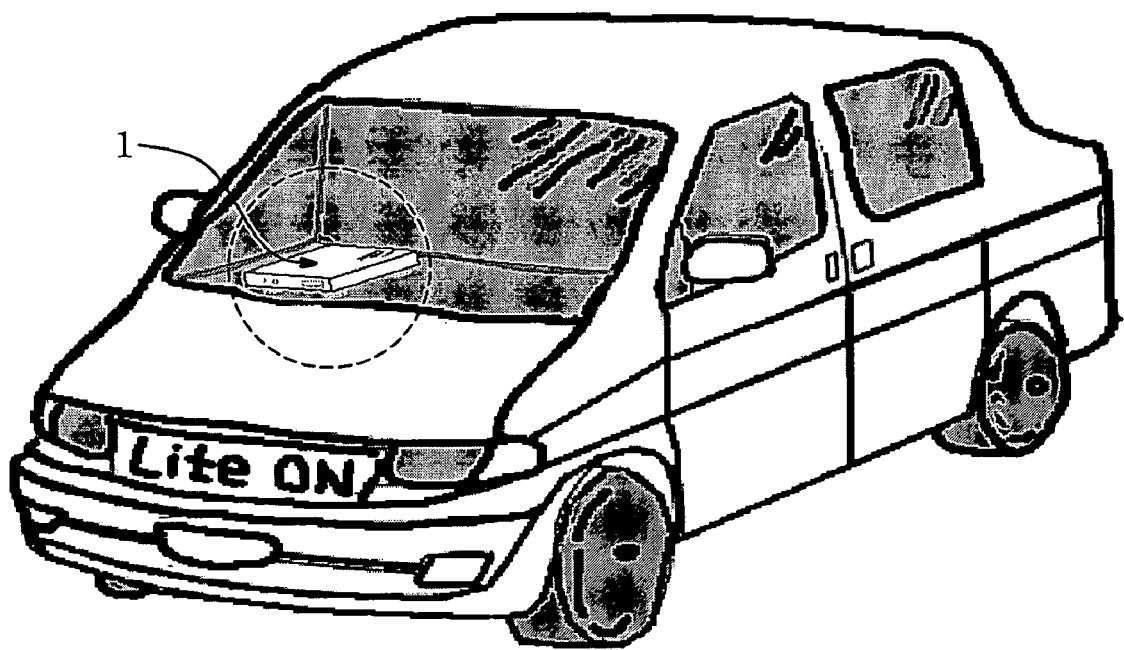
FIG. 11 illustrates how the disc drive according to the present invention is mounted in an automobile.

Referring to FIG. 7, it is an exploded view of the fourth preferred embodiment of a cushion assembly 8 according to the present invention. Base on the elements and construction similar to the second preferred embodiment, each of the cushion assembly 8 according to the fourth preferred embodiment further has a suction cups 5 with a threaded rod 51. The lower end face 421 of the retarding member 4 further has a lower threaded hole 43 extending inwardly and axially from the lower end face 421. Therefore the suction cups 5 is fixed to the retarding member 4 by engaging a peripheral wall defining the lower threaded hole 43 in the retarding member 4. Please refer to FIG. 8. FIG. 8 illustrates how a plurality of the cushion assemblies 8 according to the fourth preferred embodiment is used in a disc drive. Similar to what have been explained in the second embodiment, four pieces of the cushion assemblies 8 constructed according the fourth preferred embodiment are attached to four threaded holes 11 in the bottom wall of a casing 1 of the disc drive. And of course, the cushion assemblies 8 according the third preferred embodiment using on a disc drive can work in similar sense. Please refer to FIG. 9 and FIG. 10. FIG. 9 and FIG. 10 are a top view and a bottom view of a disc drive that is provided with four pieces of the cushion assemblies 8 constructed according the fourth preferred embodiment, respectively. Under this condition, the four suction cups 5 can be pressed against a mounting wall (not shown) so as to be fastened thereon, thereby enhancing the absorbing ability of the casing 1 of the disc drive when the automobile is in motion, in case the disc drive is used in the automobile as shown in FIG. 11.

With the employment of the cushion assembly 8 of the present invention, the vibration-absorbing ability of the disc drive is relatively increased, especially when the disc drive operates in an unsteady environment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cushion assembly for absorbing vibration of a disc drive, comprising:

a retarding member having a base portion and an upper portion formed with an upper end face, and being formed with a guiding hole extending inwardly and axially from said upper end face;

a support member including a support disc disposed above said upper end face of said retarding member, a guiding post extending co-axially and downwardly from a low side of said support disc into said guiding hole in said retarding member, and a connecting element disposed on an upper side of said support disc;

an urging member sleeved around said retarding member for urging said support disc upwardly and axially away from said retarding member; and a suction cup fixed to said base portion of said retarding member for mounting detachably on a supporting surface.

2. The cushion assembly according to claim 1, wherein said base portion of said retarding member has a lower end face opposite to said upper end face and formed with a lower threaded hole extending inwardly and axially from said lower end face.

3. The cushion assembly according to claim 2, wherein said suction cup has an upper section formed with a threaded post for fastening said lower threaded hole in said retarding member so as to support said retarding member above said suction cup.

4. The cushion assembly according to claim 1, wherein said base portion of said retarding member has a lower end face opposite to said upper end face and a retention flange extending upwardly from said lower end face of said base portion, and said urging member being a coil spring having upper and lower ends biasing against said retention flange and said support disc of said support member respectively.

5. The cushion assembly according to claim 4, wherein said coil spring is made from metal.

6. The cushion assembly according to claim 4, wherein said coil spring is made from an elastomeric material.

7. The cushion assembly according to claim 1, wherein said retarding member is made from an elastomeric material.

8. A disc drive including a pick-up head for reading and/or writing an optical disc, the disc drive comprising:

a casing having a bottom wall formed with a plurality of connecting ports;

a plurality of cushion assemblies, each of said cushion assemblies including a connecting element fastened to a respective one of said connecting ports in said bottom wall of said casing; and a plurality of suction cups fixed respectively to said cushion assemblies for mounting detachably on a supporting surface.

9. The disc drive according to claim 8, wherein said connecting ports are threaded holes.

10. The disc drive according to claim 8, wherein each of said cushion assemblies includes:

a retarding member having a base portion and an upper portion formed with an upper end face, and being formed with a guiding hole extending inwardly and axially from said upper end face;

a support member including a support disc disposed above said upper end face of said retarding member, a guiding post extending co-axially and downwardly from a low side of said support disc into said guiding hole in said retarding member, and a connecting element disposed on an upper side of said support disc; and an urging member sleeved around said retarding member for urging said support disc upwardly and axially away from said retarding member.

11. The disc drive according to claim 10, wherein said base portion of said retarding member has a lower end face opposite to said upper end face, and the disc drive further comprising an adhesive material, wherein said suction cup is attached firmly to the lower end face via said adhesive material.

12. The disc drive according to claim 10, wherein said base portion of said retarding member has a lower end face opposite to said upper end face and a retention flange extending upwardly from said lower end face of said base portion, said urging member being a coil spring having upper and lower ends respectively biasing against said retention flange and said support disc of said support member.

13. The disc drive according to claim 12, wherein said coil spring is made from metal.

14. The disc drive according to claim 12, wherein said coil spring is made from an elastomeric material.

15. The disc drive according to claim 10, wherein said retarding member is made from an elastomeric material.

16. The disc drive according to claim 8, wherein said base portion of said retarding member has a lower end face opposite to said upper end face, and formed with a lower threaded hole extending inwardly and axially from said lower end face.

17. The disc drive according to claim 16, wherein said suction cup has an upper section formed with a threaded post for fastening said lower threaded hole in said retarding member so as to support said retarding member above said suction cup.

* * * * *